UNITED STATES PATENT OFFICE.

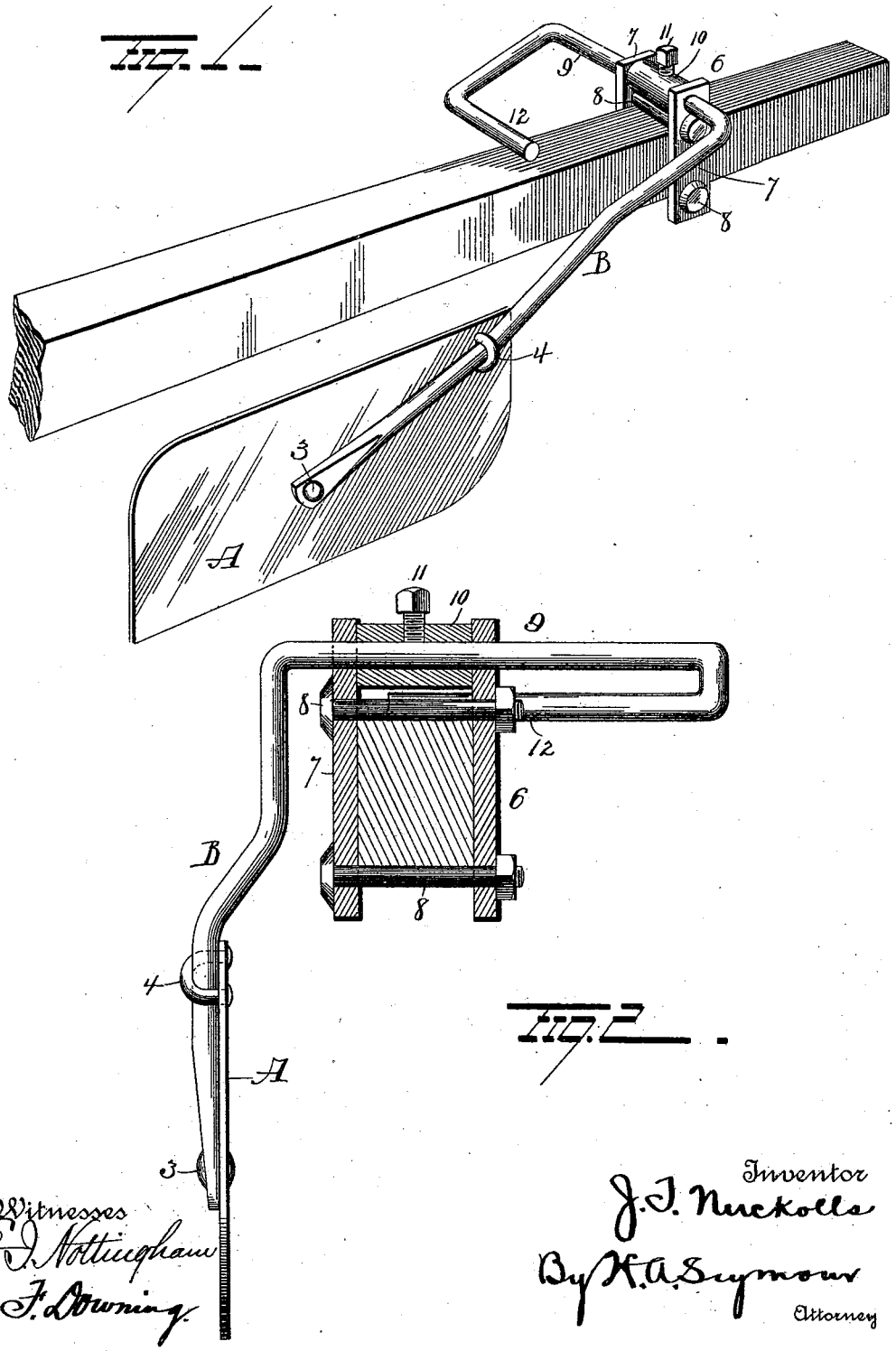

JAMES T. NUCKOLLS, OF FORT MITCHELL, ALABAMA.

PLOW-FENDER.

SPECIFICATION forming part of Letters Patent No. 546,675, dated September 24, 1895.

Application filed June 25, 1895. Serial No. 554,010. (No model.)

*To all whom it may concern:*

Be it known that I, JAMES T. NUCKOLLS, of Fort Mitchell, in the county of Russell and State of Alabama, have invented certain new and useful Improvements in Plow-Fenders; and I do hereby declare the following to be a full, clear, and exact description of the invention, such as will enable others skilled in the art to which it appertains to make and use the same.

My invention relates to an improvement in plow-fenders, the object being to provide a simple, cheap, and efficient fender capable of lateral and longitudinal adjustment relative to the plow-beam.

With this end in view my invention consists in certain novel features of construction and combinations of parts, as will be hereinafter more fully described, and pointed out in the claims.

In the accompanying drawings, Figure 1 represents a view of my improvement as applied to a plow, and Fig. 2 is a sectional view of same.

A represents a fender-blade, constructed of any suitable material, and B is the shank or arm, rigidly secured to the forward end of said fender-blade by means of rivet 3 and staple 4 or in any approved manner.

Located on plow-beam 5 is an adjustable clamp 6, which latter is composed of a pair of plates 7 7 and connecting-bolts 8 8. Pivotally mounted in the upper ends of plates 7 7 is the horizontal member 9 of shank B, said member being constructed of sufficient length to allow of a reasonable amount of lateral adjustment. Mounted on said member 9 and between the plates 7 7 is the adjusting-sleeve 10, which latter is provided with a thumb set-screw 11, by means of which it is locked to member 9 when desired, and as said sleeve is prevented from moving laterally by means of plates 7 7 it will be seen that when it is secured to member 9 the latter is also locked against lateral movement. When it is desired to increase or decrease the distance between the plow-point and fender-blade, sleeve 10 is loosened on member 9 and the latter moved in the desired direction, which operation moves fender-blade A in the same direction taken by member 9, after which sleeve 10 is again locked to member 9.

The free end of fender-arm or shank B is bent to form a stop 12, which latter is, preferably, parallel with member 9, and is adapted to limit the downwardly movement of fender-blade A. Stop 12, when in its normal position, is adapted to rest on top of the plow-beam.

My improved fender can be adjusted longitudinally as well as laterally by simply loosening the nuts on bolts 8 8 and then moving clamp 6 in the desired direction on the plow-beam, and when the desired point of location is reached the nuts above mentioned are tightened, and the clamp is thereby locked against accidental displacement.

By employing the means above referred to for regulating the lateral movement of fender-blade A the rocking or swinging movement thereof is not interfered with, and hence it will be observed that fender-blade A will be free to ride over all obstructions which it comes in contact with.

It is evident that changes in the construction and relative arrangement of the several parts might be made without avoiding my invention, and hence I would have it understood that I do not restrict myself to the particular construction and arrangement of parts shown and described; but, Having fully described my invention, what I claim as new, and desire to secure by Letters Patent, is—

1. The combination with a plow beam, of a fender, the shank of which extends laterally and transversely of the beam with which it has pivotal connection, and is provided with a stop on its free end which rests on the beam to limit the depression of the fender, substantially as set forth.

2. In a plow fender, the combination with an adjustable clamp carried by the plow beam, of a fender pivoted and laterally adjustable in said clamp, a stop for regulating the downward thrust of said fender and a sleeve provided with a set screw mounted on the fender arm whereby the latter may be locked in any desired lateral position, substantially as set forth.

3. In a plow fender, the combination with a clamp adapted to be secured to a plow beam, of a fender the shank of which is pivotally connected to the clamp, said shank having a stop formed thereon adapted to engage the plow beam to limit the downward movement of the fender, and means engaging the clamp for regulating the lateral adjustment of the fender, substantially as set forth.

In testimony whereof I have signed this specification in the presence of two subscribing witnesses.

JAMES T. NUCKOLLS.

Witnesses:
 HARTWELL B. PERRY,
 HOWARD PERRY.